(No Model.)
G. W. SCHERMERHORN.
VESSEL.
No. 518,702. Patented Apr. 24, 1894.
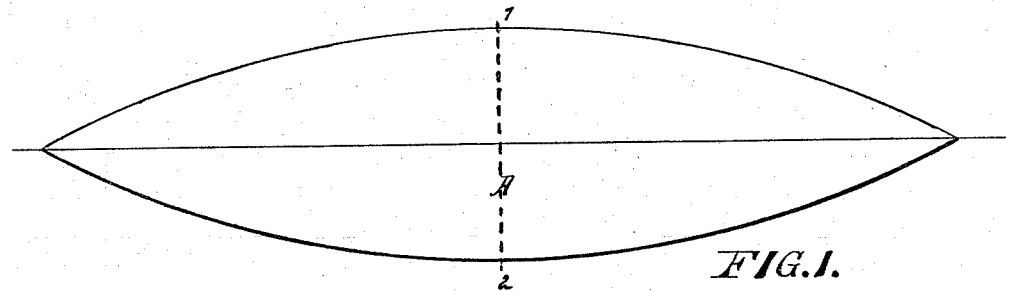
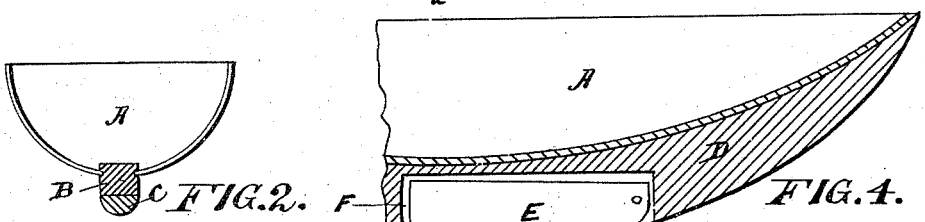
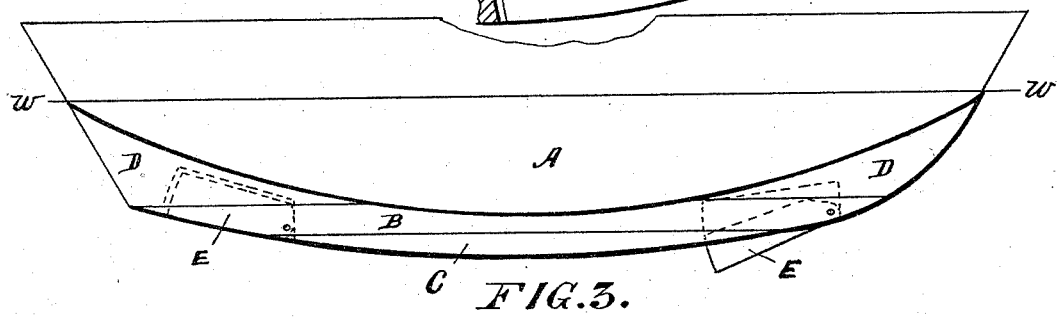
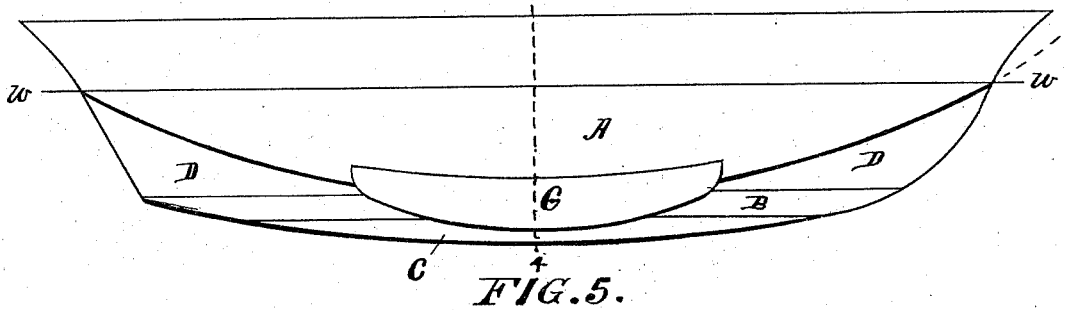
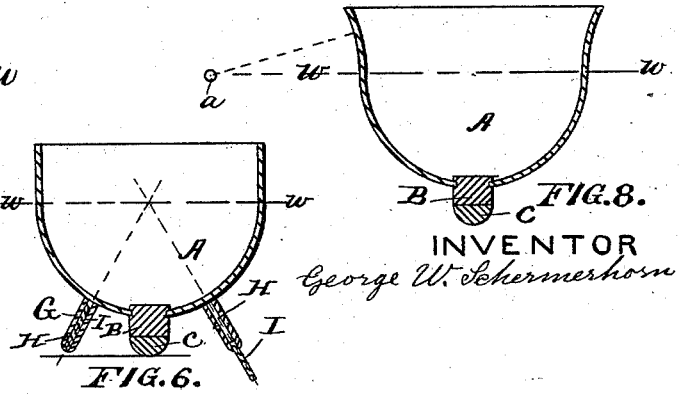
WITNESSES:
George W. Seltzer
Augustus H. Beckmann
INVENTOR
George W. Schermerhorn
THE NATIONAL LITHOGRAPHING COMPANY,
WASHINGTON, D. C.

UNITED STATES PATENT OFFICE.

GEORGE W. SCHERMERHORN, OF PHILADELPHIA, PENNSYLVANIA.

VESSEL.

SPECIFICATION forming part of Letters Patent No. 518,702, dated April 24, 1894.

Application filed December 29, 1892. Serial No. 456,695. (No model.)

*To all whom it may concern:*

Be it known that I, GEORGE W. SCHERMERHORN, a citizen of the United States, residing at 231 Pine street, in the city of Philadelphia, State of Pennsylvania, have invented certain new and useful Improvements in Vessels, of which the following is a specification.

My invention relates to improvements in the construction of hulls of vessels and more particularly to improvements in the shape or line of the hull beneath the load water line. The form of my vessel beneath the load water line is that of one half of a circular spindle, that is to say, its shape would conform to the figure formed by revolving an arc of a circle about its chord, the chord being of a length corresponding to the length of the load water line, and the versed sine of the arc being equal to the depth of the hull amidships. The projecting part of the keel of the vessel, or the shoe attached to the bottom of the keel, has also a circular spindle shape. The vessel is preferably furnished at both ends with a skeg or dead wood in which may be placed center boards, one at each or either end. The vessel may be further furnished with bilge keels, which in order to present the least resistance to the passage of the vessel through the water, are attached to the hull in such a manner that a plane passing through their center also passes through the longitudinal axis of the lower part of the hull. The bilge keels may be furnished with extensible boards similar in construction to the ordinary center board. The upper works of the vessel above the load water line may be constructed in any suitable manner.

In the accompanying drawings forming part of this specification, and in which similar letters of reference indicate similar parts throughout the several views, Figure 1, is a bottom plan of a vessel constructed upon my lines; Fig. 2, a section of Fig. 1, on line 1—2; Fig. 3, a side elevation of the vessel—Fig. 1; Fig. 4, an enlarged longitudinal sectional view of one end of the vessel showing centerboard in the dead wood; Fig. 5, a side view of vessel furnished with bilge keels; Fig. 6, a transverse section of Fig. 5 on line 3, 4; and Figs. 7 and 8, cross sections of the vessel showing the hull furnished with sides or upper works tumbling in and falling out.

A. is the hull of the vessel beneath the load water line and the shape of which is that of half of a circular spindle, the ends of the spindle forming the extreme ends of the vessel on the load water line.

B. is the keel of the vessel and C. the lead or iron ballast shoe which is bolted to the keel and which also has the shape of half of a circular spindle, the flat side of which lies against the keel.

D. is the dead wood of the vessel.

E. are center boards, of which there may be one placed at each end of the vessel, and the wells for which are placed partly or wholly in the dead wood so as not to cut the timbers of the vessel and weaken them. These center boards are shown in Fig. 3, one forward and one aft, the forward one being lowered and the after one raised.

In Fig. 4, a longitudinal sectional view of one end of the vessel is shown, showing the arrangement of the centerboard in the dead wood.

F. is the centerboard well which is formed in the dead wood.

G, Figs. 5 and 6, are bilge keels attached to a vessel of my construction—these bilge keels are attached in any suitable manner to the side of the vessel and in order that they may present the minimum resistance to the water they are attached radially to the vessel, that is they lie in planes which pass through the longitudinal axis of the vessel and in addition to presenting the least resistance to the passage of the vessel through the water, the bilge keels if placed upon the hull as described will produce a much better result in keeping the vessel from rolling. These bilge keels may be furnished with grooves or wells H—in which extensible boards I. similar to centerboards may be placed, which may be dropped when the bilge keels themselves would not be large enough to prevent the vessel rolling in very rough weather. In addition to preventing the vessel from rolling the bilge keels are used to form shoes to prevent the vessel from falling too far over upon its sides when grounded. If the bilge keels are made with grooves as described, their bottom should be shaped like the shoe on the keel, that is one half of a circular spindle.

The shape of my vessel may be modified to some extent without departing from the spirit of my invention, for instance the lower central part of the vessel may have a half cylindrical shape and the ends may have the form shown, in other words the vessel shown may be cut in half and lengthened by introducing a section having a lower part having the shape of one half a cylinder, the diameter of which would correspond to the beam of the vessel amidships and which might have any length desired.

The stem or stern from the water line upward may be perpendicular or may be raked forward or aft as may be desired, or they may be formed by continuing the curve of the bottom upward past the load water line as indicated by dotted lines in Fig. 5.

The top side of the vessel above the water line may be perpendicular as shown in Fig. 6, or it may fall in as shown in Fig. 7, or out as shown in Fig. 8; should either of these latter constructions be used, the curve of the top side should be an arc of a circle struck from a point upon the plane of the water line of the vessel. In the drawings the centers from which these arcs are struck are indicated by a small circle lettered $a$. The water line is indicated by the line $w$—$w$. In some cases the keel or shoe and the dead wood at either or both ends of the vessel may be dispensed with.

I am aware that various forms of spindle and different modifications of the spindle have been used as models for vessels and are known as spindle formed boats. I am also aware that bilge keels are old, therefore I do not broadly claim either, but What I do claim is—

A boat, the body portion of which, beneath the load-water line is in the form of a section of a circular spindle of coinciding curvature upon every longitudinal section, and having a ballast keel or shoe in the form of half of a circular spindle, and a dead wood secured to and connecting said vessel and ballast shoe, substantially as described.

GEORGE W. SCHERMERHORN.

Witnesses:
GEORGE W. SELTZER,
AUGUSTUS H. BECKMANN.